(12) United States Patent
Prunean (10) Patent No.: US 10,323,671 B2
(45) Date of Patent: Jun. 18, 2019

(54) METHOD FOR INSTALLING AN ANCHOR (71) Applicant: David C. Prunean, Camas, WA (US)

(72) Inventor: David C. Prunean, Camas, WA (US)

(*) Notice: Subject to any disclaimer, the term of this patent is extended or adjusted under 35 U.S.C. 154(b) by 26 days.

(21) Appl. No.: 15/423,509

(22) Filed: Feb. 2, 2017

(65) Prior Publication Data

US 2017/0146043 A1 May 25, 2017

Related U.S. Application Data (62) Division of application No. 13/726,086, filed on Dec. 22, 2012, now Pat. No. 9,592,592.

(60) Provisional application No. 61/579,765, filed on Dec. 23, 2011.

(51) Int. Cl.
| | |
|---|---|
| *B23P 19/02* | (2006.01) |
| *F16B 13/08* | (2006.01) |
| *F01D 25/18* | (2006.01) |
| *E04B 1/41* | (2006.01) |
| *F16H 57/04* | (2010.01) |
| *F16N 17/00* | (2006.01) |
| *F16N 29/02* | (2006.01) |
| *B25B 27/02* | (2006.01) |
| *B25D 16/00* | (2006.01) |
| *B25C 1/14* | (2006.01) |

(52) U.S. Cl.
CPC .......... *F16B 13/0816* (2013.01); *B23P 19/02* (2013.01); *E04B 1/4114* (2013.01); *F01D 25/18* (2013.01); *F16H 57/0443* (2013.01); *F16N 17/00* (2013.01); *F16N 29/02* (2013.01); *B25B 27/02* (2013.01); *B25C 1/146* (2013.01); *B25D 16/00* (2013.01); *B25D 2216/0015* (2013.01); *B25D 2216/0038* (2013.01); *Y10T 29/49945* (2015.01); *Y10T 29/49963* (2015.01); *Y10T 29/5393* (2015.01); *Y10T 279/3418* (2015.01)

(58) Field of Classification Search
CPC ................. F16B 13/0816; F16B 13/06; B25D 2216/0023; E04B 1/414; Y10T 279/3418; Y10T 29/49963; Y10T 29/49945; Y10T 29/5393; B25C 1/146; B23P 19/02; B25B 27/02
See application file for complete search history.

(56) References Cited

U.S. PATENT DOCUMENTS

| | | | | |
|---|---|---|---|---|
| 1,164,903 | A | * 12/1915 | Ackerman et al. | ..... B25B 27/02 29/234 |
| 1,769,591 | A | * 7/1930 | McIntosh | ................ B25B 31/00 29/234 |
| 2008/0038079 | A1 | * 2/2008 | Bobon | .................. F16B 5/0216 411/57.1 |

(Continued)

*Primary Examiner* — Jermie E Cozart
(74) *Attorney, Agent, or Firm* — Cionca IP Law P.C.; Marin Cionca (57) ABSTRACT

A method for installing an anchor having: making a hole into the material in which the anchor is to be installed, by using a hammer drill; after associating an anchor driver with the chuck of the hammer drill, using the so created anchor driver-hammer drill first assembly, with the hammer drill in hammer mode, to hammer the anchor into the hole; and, after switching the hammer drill to drill mode, tightening the nut or bolt of the anchor using the anchor driver-hammer drill first assembly, or a second assembly comprising the hammer drill and a socket.

5 Claims, 6 Drawing Sheets

(56) References Cited

U.S. PATENT DOCUMENTS

| | | | |
|---|---|---|---|
| 2008/0173141 A1* | 7/2008 | Wallek | B25B 31/00 81/177.1 |
| 2009/0123251 A1* | 5/2009 | Dubon | F16B 19/125 411/20 |
| 2009/0180839 A1* | 7/2009 | Kardas | B25B 23/141 405/259.1 |
| 2009/0302088 A1* | 12/2009 | Santamarina | B25B 31/00 227/139 |
| 2010/0264191 A1* | 10/2010 | Foster | B25B 31/00 227/147 |

* cited by examiner

METHOD FOR INSTALLING AN ANCHOR

CROSS-REFERENCE TO RELATED APPLICATIONS

This application is a divisional application of and claims the benefit of U.S. Non-Provisional application Ser. No. 13/726,435, filed on Dec. 22, 2012, now U.S. Pat. No. 9,592,592, which claims the benefit of U.S. Provisional Application No. 61/579,765, filed Dec. 23, 2011, which are hereby incorporated by reference, to the extent that they are not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to the tool technology and more particularly to tools for installing anchors in concrete.

2. Description of the Related Art

Currently, with the existing tools and methods, installing anchors in concrete is a slow, labor intensive and costly process, as it involves a significant amount of manual labor.

The process used to fasten anchors to concrete has basically remained unchanged over the years. Although there are epoxy/chemical type anchors in use today, the majority of concrete anchors still rely on the same principles that were developed many years ago. Typically, a hole with a certain amount of volume is made and then more material is inserted into the hole. This increased volume of material pushes against the interior wall of the hole and creates friction. This friction is how most mechanical concrete anchors obtain their holding values.

All mechanical type concrete anchors work based on the same basic principle: drill a specific size hole, insert the anchor and expand the anchor inside the hole in order to make it difficult for the anchor to be pulled out of the hole.

Fastening to concrete is unique compared to other fastening applications, such as fastening two pieces of metal together by using a screw or a bolt and a nut. Concrete anchors are much more difficult to install and use. In the same time, concrete is the most widely used base material in the world for the last 2000 years and probably will remain so for the next 2000 years due to its simplicity, strength, versatility and the abundance of the ingredients used to make it.

The process with which anchors are currently fasten to concrete includes typically the following steps: a hole is made in the concrete; then, the anchor is inserted in the hole to take up the space created, and the material in or on the anchor is expanded in the hole, by manually hammering directly on the anchor or hammering on a setting tool; and then, finally, a bolt or a nut, depending on the type of anchor used, is manually ratcheted into place. Obviously, the process is labor intensive and slow, and thus, costly and inefficient.

Thus, there is a need for new and improved tools and methods that address the problems described above.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment a wedge anchor driver is disclosed. In another exemplary embodiment, a drop-in anchor driver is disclosed. Both drivers are installable in a typical hammer drill. Thus, an advantage is that a considerable amount of manual labor needed to drive and secure the anchors is eliminated. Another advantage is that the process of installing anchors is much faster and efficient.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 2a illustrate a back perspective view of a solid wedge anchor driver, according to another embodiment.

FIGS. 2b-c illustrate side views of the solid wedge anchor driver from FIG. 2a.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

Figure 1:
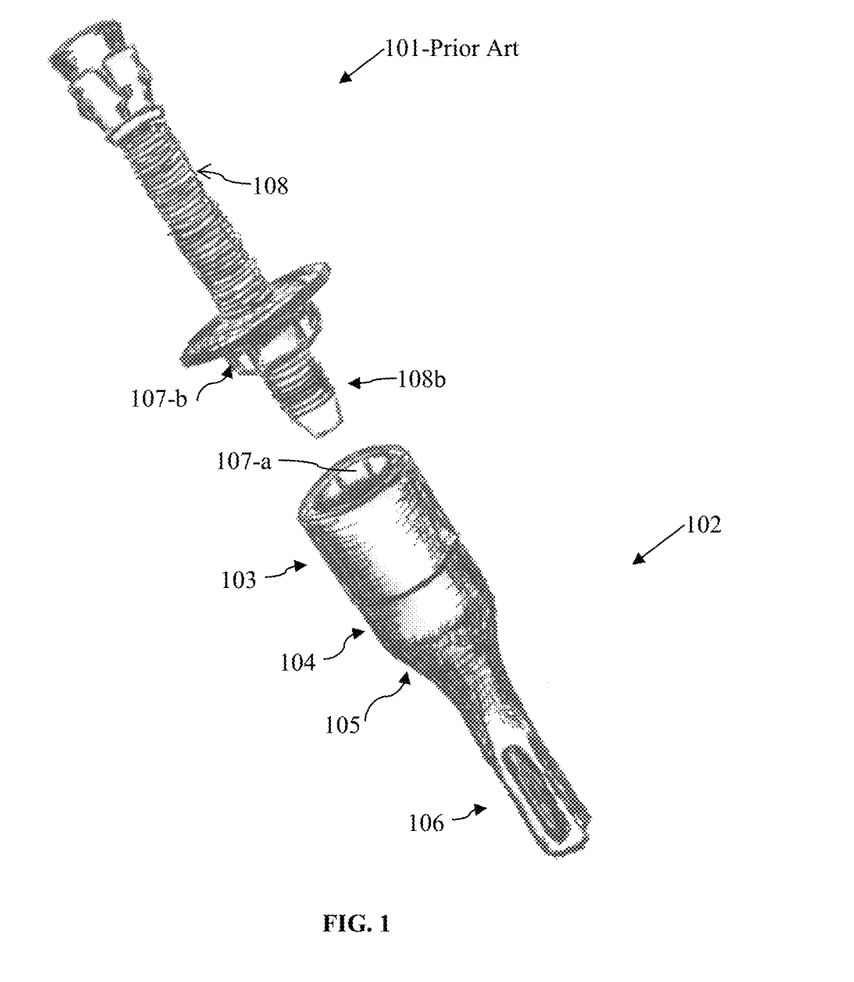
FIG. 1 illustrates perspective views of a typical wedge anchor (prior art) 101, and an adjustable wedge anchor driver 102 according to one embodiment.

Referring to FIG. 1, perspective views of a wedge anchor 101 (prior art), and of an adjustable wedge anchor driver 102 according to one embodiment are shown. The wedge anchor 101 is an example of a typical wedge anchor known in the art. The adjustable wedge anchor driver 102 is one of the embodiments of the invention disclosed herein. The adjustable wedge anchor driver 102 essentially consists of two concentric cylinders, 103 and 104, having substantially the same or different diameters, whereby, the two cylinders 103, 104 are positioned end-to-end, and may be removably joined together via a connection (see 312/314 in FIGS. 3a-d) similar to, for example, that used to installing a typical socket on a socket wrench.

The first cylinder 103, which is on the front end of the two-cylinder assembly, may be in essence a modified socket (preferably stronger though) for a socket wrench, with an opening 107-a configured to fit onto the nut 107-b of the wedge anchor 101 and also configured with an opening (see 308a in FIGS. 3b and 3d), to accommodate the outer bolt end 108b, so that a user may, after the wedge anchor driver is secured in the chuck of a hammer drill as it will be explained in more details later, employ the wedge anchor driver 102 to press the bolt 108 in a concrete hole and tighten the nut 107-b.

The back end of the second cylinder 104, may be connected, removably or irremovably, to a shank 106. The shank 106 may be configured to be capable of being installed in the chuck of any standard hammer drill. The shank 106 allows the wedge anchor driver 102 to be used in conjunction with a standard hammer drill, as oppose to a manual use of the driver, which dramatically increases the speed of installing wedge anchors, as it will be described and explained in more details later herein.

For increased strength, it may be preferable to construct the second cylinder 104 and the shank 106 as one piece, through known manufacturing processes such as casting, welding and/or machining Furthermore, for increasing the strength of the wedge anchor driver 102, while still maintaining control over the volume and the weight of the driver, as shown in FIG. 1, a conical transition section 105 may be used.

It should be apparent that, the shape and size, such as the outside diameter of the first cylinder 103 and the size of its opening 107-a, could vary as necessary to correspond to the standard sizes of the wedge anchors available on the market, or to other shapes and sizes of wedge anchors which a user may wish to use. It should also be apparent that the length of first cylinder 103, as well as its internal configuration (see 307a and 308a in FIGS. 3b and 3d) must be such that it may accommodate the outer end 108b of the bolt 108 of the wedge anchor 101.

It should be apparent that the first and the second cylinder 103 and 104, may have other shapes, besides the cylinder-like shape shown and suggested by the nomenclature used herein.

In most cases, it is preferable that the wedge anchor driver 102 measures approximately 5 (five) inches in length.

Figures 2A, 2B:
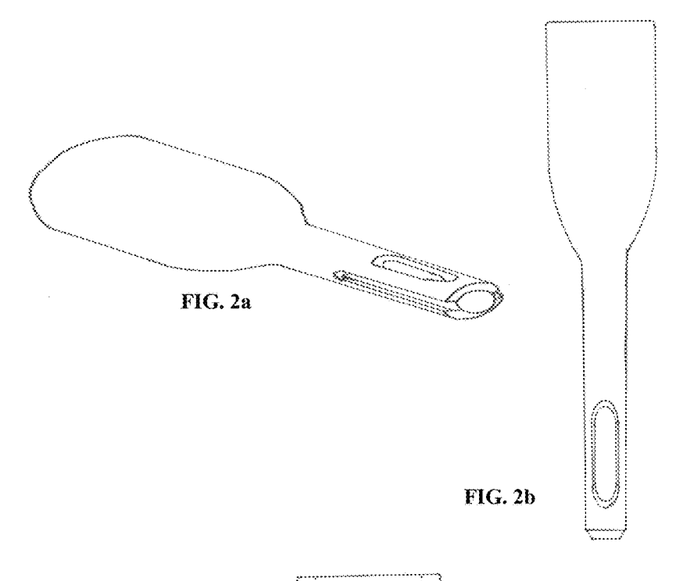
Figure 2C:
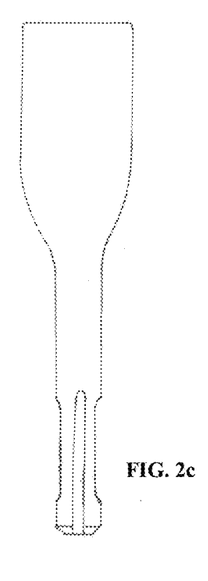
Figure 2D:
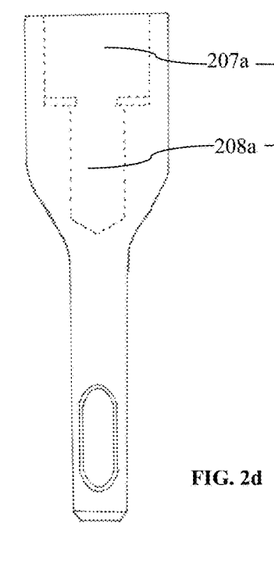
FIG. 2d is a side view of the solid wedge anchor driver from FIG. 2a depicting also the inside openings 207a and 208a shown in perspective in FIG. 2e.
Figure 2E:
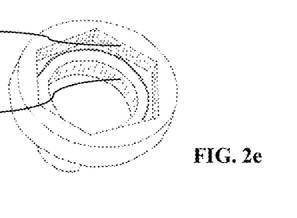
FIG. 2e is a front perspective view of the solid wedge anchor driver from FIG. 2a FIGS. 3a-b illustrate a side view of the adjustable wedge anchor driver 102 from FIG. 1, with first cylinder 303 (103 in FIG. 1) being detached.

FIG. 2a illustrate a back perspective view of a solid wedge anchor driver, according to another embodiment. FIGS. 2b-c illustrate side views of the solid wedge anchor driver from FIG. 2a. FIG. 2d is a side view of the solid wedge anchor driver from FIG. 2a depicting also the inside openings 207a and 208a shown in perspective in FIG. 2e. FIG. 2e is a front perspective view of the solid wedge anchor driver from FIG. 2a. As the name suggests, and as shown, the solid wedge anchor drivers depicted in FIG. 2a-e are constructed as a one-piece tool, one for each size of wedge anchors. In other words, the first cylinder 103, the second cylinder, and shank 106 (FIG. 1) are are all integrated in one piece. Thus, solid wedge anchor drivers may need to be manufactured and sold as a set, so that a user has one available for all typical shapes and sizes of wedge anchors.

For each solid wedge anchor driver in a set, the first opening 207a needs to be shaped and sized to fit a particular size and shape of the nut 107-b (FIG. 1). Similarly, the second opening 208a, needs to be shaped and sized to fit a particular size, shape and expected length (after tightening of nut 107-b) of the bolt end 108b (FIG. 1).

The solid wedge anchor driver may be advantageous to use, for example, when working with a single size of wedge anchor, which needs to be installed repeatedly. It should also be apparent, that the solid wedge anchor driver offers increased strength, which may be critical when performing heavy duty jobs. One difference between the adjustable wedge anchor driver, depicted in FIG. 1 and FIGS. 3a-d, and the solid wedge anchor drivers depicted in FIGS. 2a-e is that the member 309 (FIGS. 3a and 3c) that locks into the hammer drill, in the adjustable version, is universal for all "socket" (i.e., first cylinder 303) sizes. This may be advantageous, for example, when working with several sizes of wedge anchors at the same time, as only a quick replacement of first cylinder 303 would be necessary, after only a one time installation of member 309 in the chuck of the hummer drill.

Figures 3A, 3B:
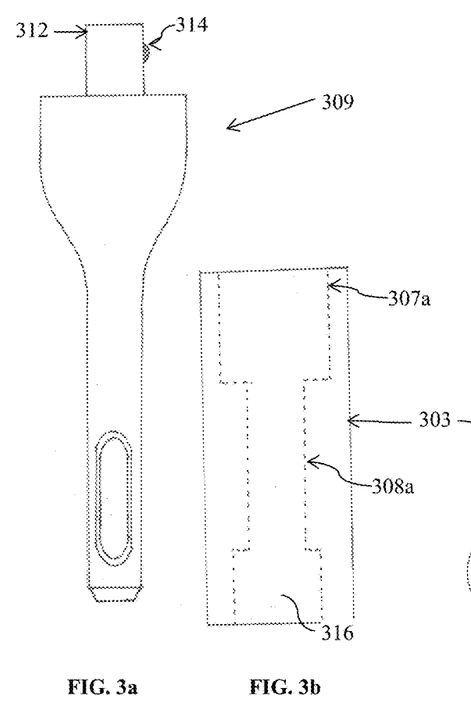
Figure 3C:
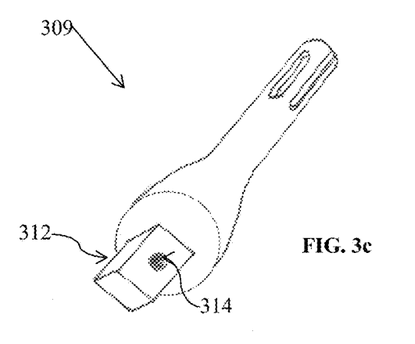
FIGS. 3c-d illustrate a front perspective view of the adjustable wedge anchor driver 102 from FIG. 1, with first cylinder 303 being detached.
Figure 3D:
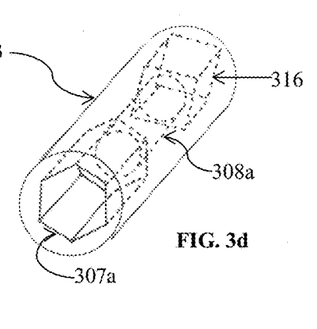

FIGS. 3a-b illustrate a side view of the adjustable wedge anchor driver 102 from FIG. 1, with first cylinder 303 (103 in FIG. 1) being detached. FIGS. 3c-d illustrate a front perspective view of the adjustable wedge anchor driver 102 from FIG. 1, with first cylinder 303 being detached. Thus, as shown in FIGS. 3a and 3c, a rectangular protrusion 312 that contains a spring-loaded ball mechanism 314 may be used to keep the first cylinder 303 in place. The rectangular protrusion 312 fits into the third opening 316 of the first cylinder 303.

Again, the first cylinder has a first opening 307a, having for example a hexagonal cross-section, sized to fit a particular size of a nut 107-b (FIG. 1) of a typical wedge anchor. Similarly, the first cylinder 303 has a second opening 308a shaped and sized to fit the expected length of the bolt end 108b (FIG. 1), after the tightening of the nut 107-b, once the wedge anchor is in place, as will be explained in more details later. If, for example, after tightening, the expected length of the bolt end 108b is between ¾ inches and 1 (one) inch, the length of second opening 308a has to be at least 1 (one) inch.

Like it is the case with the solid wedge anchor drivers, there also may be a set of sizes for the adjustable wedge anchor driver; however, this set would include only one installation member 309 and a set of first cylinders 303 of various sizes.

Testing of prototypes show that the solid wedge anchor driver is longer lasting for heavy use such as in construction work. However, at the same time, the adjustable wedge anchor driver is more attractive for its variations that can be accommodated in a small kit that can be stored in a confined space, such as in the limited available space of a rescue vehicle.

Figure 4A:
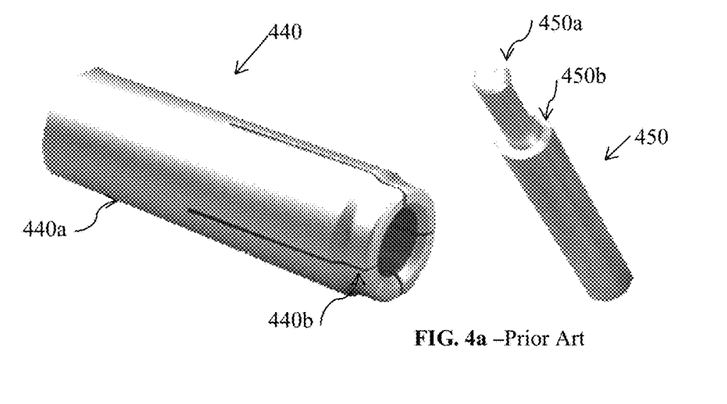
FIG. 4a illustrates a perspective view of a typical drop-in anchor 440 (prior art) and of a manual drop-in setting tool 450 (prior art).

FIG. 4*a* illustrates a perspective view of a typical drop-in anchor 440 (prior art) and of a manual drop-in setting tool 450 (prior art). As known in the art, drop-in anchors 440 are female anchors designed to be placed and fastened in concrete, or other hard material, and then to have a threaded rod or bolt (not shown) fastened to it. The drop-in anchor 440 is typically made-up of two parts: the expansion shield 440*a* (made from zinc plated carbon or stainless steel) and a case hardened expander plug (not shown) that is cone-shaped and also made typically from zinc plated carbon or stainless steel. As shown in FIG. 4*a*, one end of the shield 440*a* is normally tapered, and has four cut slots 440*b* that run a portion of its length. The surface of the tapered end may be smooth or knurled while the other end is typically smooth. The expander plug is placed at the end of the anchor 440 that has the four slots 440*b*, while the other end of the anchor is threaded, such that a bolt or threaded rod may be screwed into the anchor.

The anchor is set by placing the anchor into a hole in concrete or other similar materials, and by setting the expander plug using a manual setting tool 450. Each diameter of drop-in anchor 440 has typically a specific, corresponding manual setting tool 450. As shown in FIG. 4*a*, the manual setting tool 450 is typically a steel rod with one end 450*a* being necked down. Once the drop-in anchor 440 is inserted into the concrete hole, the necked down portion 450*a* of the manual setting tool 450 is inserted into the drop-in anchor 440. The manual setting tool 450 is then pounded with a hammer by a worker until the lip of the anchor (not shown) meets the lip 450*b* of the manual setting tool 450. This action pushes the expander plug (not shown) down into the drop-in anchor 440 expanding the portion of the anchor where the four cuts 440*b* are.

As with all female type anchors, the size of the designated size of the anchor correlates with the bolt size that goes into the anchor. Also, as one of ordinary skills knows, generally, the hole size in the concrete, is slightly larger than the anchor size.

It should be apparent that the prior art manual setting of the drop-in anchor described above is labor intensive, show, inefficient, and thus, costly. Thus there is a need for a new and improved drop-in anchor driver that addresses these problems.

Figures 4B, 4C:
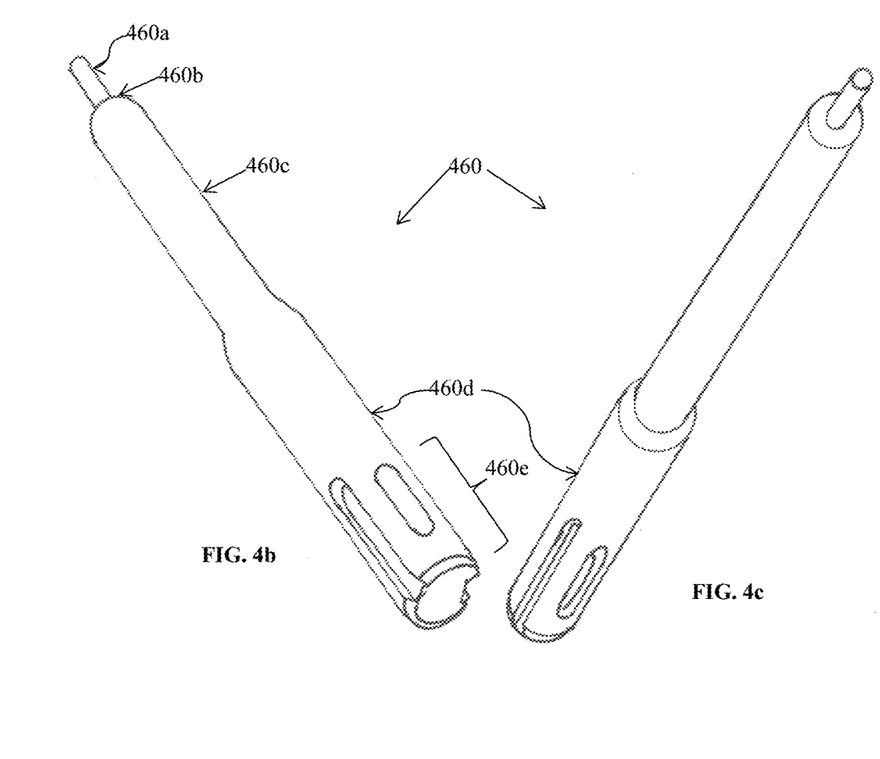
FIGS. 4b-c illustrate back and front perspective views, respectively, of a solid drop-in anchor driver, according to another embodiment.
Figure 4D:
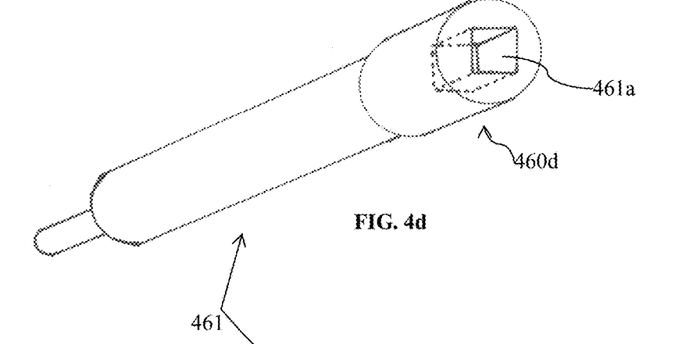
FIGS. 4d-e illustrate back and front perspective views, respectively, of an adjustable drop-in anchor driver, according to another embodiment.
Figure 4E:
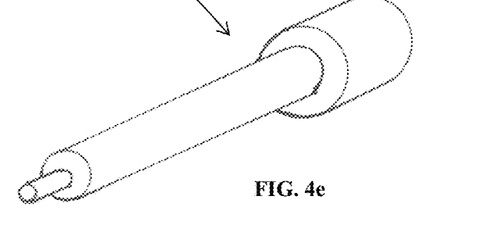
Figures 4F, 4G:
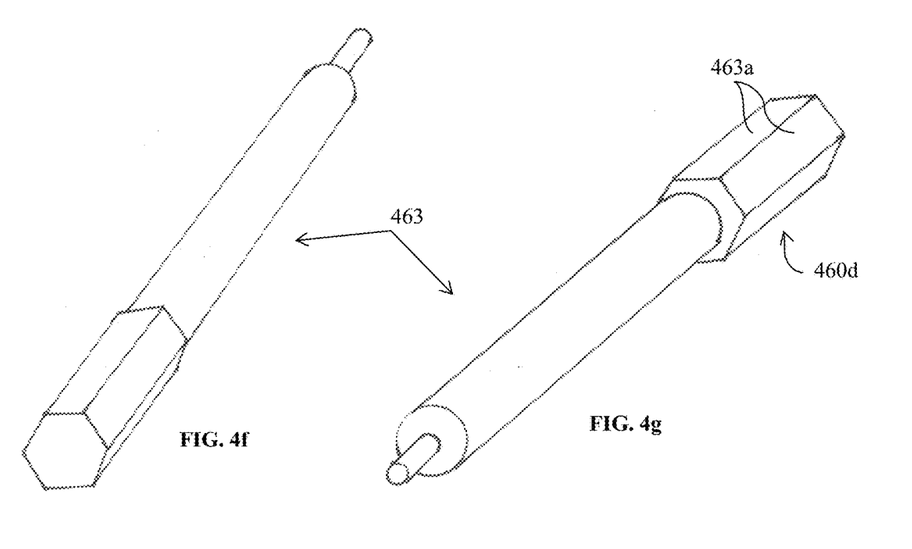
FIGS. 4f-g illustrate back and front perspective views, respectively, of a solid hex drop-in anchor driver, according to another embodiment.

FIGS. 4*b-c* illustrate back and front perspective views, respectively, of a solid drop-in anchor driver, according to another embodiment. FIGS. 4*d-e* illustrate back and front perspective views, respectively, of an adjustable drop-in anchor driver, according to another embodiment. FIGS. 4*f-g* illustrate back and front perspective views, respectively, of a solid hex drop-in anchor driver, according to another embodiment.

As suggested by FIGS. 4*b-g*, when it comes to drop-in anchor drivers, configured to be used for a more efficient installation of drop-in anchors 440, there are actually at least three possible variations. The first, as seen in FIGS. 4*b-c*, is the solid drop-in anchor driver, which pretty much means that it is its own full solid pin driving bit, installable in a standard hammer drill, and therefore, has to come in various sizes (e.g., as a set or kit) to accommodate various sizes of the drop-in anchors.

As shown in FIGS. 4*b-c*, the solid drop-in anchor driver 460 has a first section 460*a* of a first diameter, which will be inserted into the drop-in anchor 440 to push the expander plug (not shown) into the drop-in anchor 440 for the purpose described earlier. It should be noted that the diameter and the length of the first section 460*a* will correlate with the size (diameter and length) of the respective drop-in anchor. Next, the solid drop-in anchor driver 460 has a second section 460*c* of a larger, second diameter, for strength purposes, and for creating the stop area 460*b* that will stop the second section 460*c* from entering into the drop-in anchor 440, thus, indicating how much the solid drop-in anchor driver 460 should be pushed into the drop-in anchor 440. Thus, it should be understood that the diameter of the second section 460*c* is preferably greater than the inside diameter of the drop-in anchor 440, for the purposes described above (i.e., increased strength and to function as a stop indicator).

Next, the solid drop-in anchor driver 460 has a third section 460*d* typically, as shown, having an even greater, third diameter than the second section 460*c*, for increasing the overall strength of the driver. The third section 460*d* is the section that is inserted, completely or partially, and then fastened, into a chuck of a standard hammer drill. Thus, as shown, a portion 460*e* of the third section 460*d* is configured (e.g., as shown for exemplification purposes only, with channels and depressions) to fit and be able to be properly fastened into the chuck of a standard hammer drill. Thus, naturally, the configuration of portion 460*e* will correspond with the type of hammer drill intended to be used.

Thus, to more efficiently set drop-in anchors 440, instead of manually hammering a manual setting tool 450 as described earlier, a user can use the solid drop-in anchor driver 460 installed into a standard hammer drill, which is set in the hammer position, to more rapidly, easier, and thus, more affordably, set a plurality of drop-in anchors at any given time.

The second variation of drop-in anchor driver, as seen in FIGS. 4*d-e*, is the adjustable, socket-type, drop-in anchor driver, which means that, it simply has a socket type of adapter 461*a* at the end of the third section 460*d* of the driver. This feature makes the adjustable drop-in driver 461 usable with, and/or combinable in (e.g., for sale purposes), for example, a set that includes a whole socket kit and a set of socket drop-in anchor drivers, or, in a set including only one installation member 309 (FIG. 3*c*), a set of first cylinders 303 (FIGS. 3*b,d*) of various sizes and a set of adjustable drop-in anchor drivers of various sizes to fit common drop-in anchor sizes. The socket adapter 461*a* has the advantage that, for example, once the installation member 309 (FIG. 3*c*), is installed in a hammer drill, a fast and easy solution is provided to the user by simply changing to the adjustable drop-in anchor driver 461, or to the socket (or first cylinder 303) as necessary to drive in drop-in anchors or wedge anchors, respectively.

Finally, the third variation, as seen in FIGS. 4*f-g*, is the solid hex drop-in anchor driver 463. This driver simply has the third section 460*d* as a solid hex 463*a*, so that it may be placed in a certain size socket (or first cylinder 303) and then be used for driving the drop-in driver 463 into the drop-in anchor 440. This means that each hex end 463*a* size would preferably vary with the size of the driver, and furthermore, the hex end 463*a* would be manufactured per bolt size necessary for the drop-in anchor that the driver drives. This arrangement will make possible to use the same socket (or first cylinder 303) to drive the driver in the drop-in anchor and, and then to drive in the bolt of the drop-in anchor. Furthermore, as described above when referring to the socket/adjustable drop-in anchor 461, similar sets or kits may be used, manufactured or sold together with the solid hex drop-in anchor driver 463, as the solid hex end 463*a* makes this driver installable in a socket or a first cylinder 303 of such sets or kits.

Figure 5A:
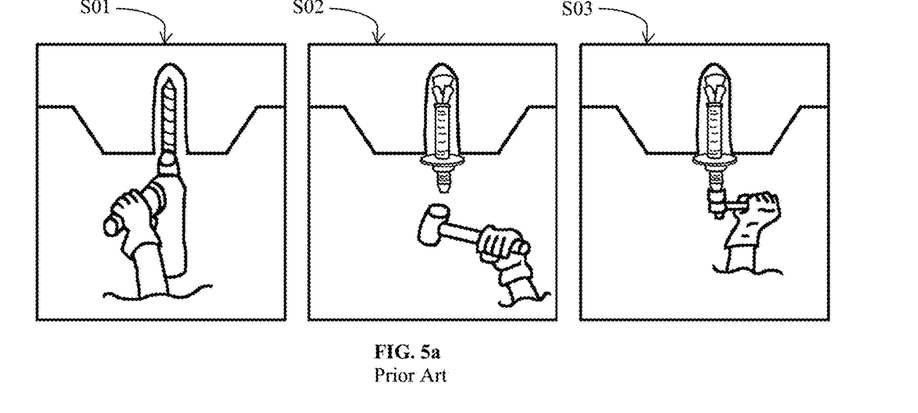
FIG. 5a illustrates the typical steps of the existing process used for fastening anchors to concrete.

FIG. 5*a* illustrates the typical steps of the existing (prior art) process used for fastening anchors to concrete. The process with which anchors are currently fasten to concrete includes typically the following steps (see FIG. 5*a*): in step S01, a hole is made in the concrete; in step S02, the anchor is inserted in the hole to take up the space created, and the material in or on the anchor is expanded in the hole, by manually hammering directly on the anchor or hammering on a setting tool 450 (if a drop-in anchor is being set); and then, finally, in step S03, a bolt (for drop-in anchors) or nut (for wedge anchors), depending on the type of anchor used, is manually ratcheted into place. Obviously, the process is labor intensive and slow, and thus, costly and inefficient.

Figure 5B:
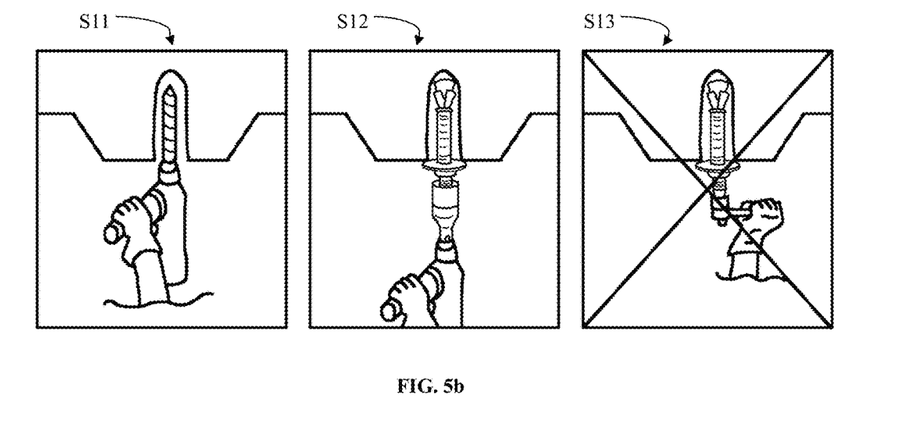
FIG. 5b illustrates a new and improved process of installing anchors, according to another embodiment.

FIG. 5*b* illustrates a new and improved process of installing anchors, according to another embodiment.

As illustrated in FIG. 5*b*, using the new and improved anchor drivers disclosed herein, the process of installing anchors is simplified and much faster, yielding to increased productivity. First, in step S11, a hole is made, similarly as in the typical process described above, using a hammer drill. Secondly, in step S12, the anchor driver is secured in the chuck of the hammer drill, and, with the hammer drill in the hammer mode, the anchor is hammered into the hole using the anchor driver-hammer drill assembly; then, if a wedge anchor is being set, the hammer drill is simply switched to the drill mode, to tighten the nut of the anchor using the anchor driver-hammer drill assembly. Thus, the job is completed in step S12, and thus, the third step S13 (manual ratcheting) is completely eliminated.

It should be noted that if a drop-in anchor is being set, then in Step 12, the user may have the installation member 309 (FIG. 3*c*), with an adjustable drop-in anchor driver 461 coupled to it, installed in the chuck of the hammer drill, to first set the drop-in anchor in place, then the user may simply replace the adjustable drop-in anchor driver 461 with a socket or a first cylinders 303 (FIGS. 3*b,d*), to fasten the corresponding bolt into the drop-in anchor.

It should be also noted that no manual hammering is needed at all using the improved process. The new and improved anchor drivers, in conjunction with a hammer drill, may be used by an installer to quickly drive and secure the anchor in place, and its corresponding nut or bolt. Thus, the new process is much faster, considerably less laborious, and much more economical.

Thus, the advantages of the invention are that driving and locking anchors becomes less strenuous and time consuming, productivity is improved significantly, and prevention of injuries is achieved. The invention removes the need of hammering with a sledge hammer and then having to ratchet to lock the anchor into position. The disclosed anchor driver is a tool that can be attached to a hammer drill, which, once the hole is drilled, it hammers and ratchets an anchor (e.g. wedge anchor) into place in one step: only a simple switch of the hammer drill's mode is needed (from the hammering mode to the non-hammering rotating mode). Additional features that make the new anchor driver appealing are its small size, compactness, and light weight.

Furthermore, as explained earlier, kits may be configured, to include, for example, only one installation member 309 (FIG. 3*c*), a set of first cylinders 303 (FIGS. 3*b,d*) of various sizes and a set of adjustable drop-in anchor drivers 461 (FIGS. 4*b-c*) of various sizes. Such kits would be relatively inexpensive while providing a large range of drive in and ratcheting functions for wedge and drop-in anchors of various sizes.

The anchor driver is preferably made of high strength steel, or other similar materials, that allow the tool to be used for a long time without the risk of breaking.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A method for installing an anchor comprising: making a hole into the material in which the anchor is to be installed, by using a hammer drill; associating an anchor driver with the chuck of the hammer drill to create an anchor driver-hammer drill assembly, the anchor driver comprising an integrally formed first portion having a first opening configured to fit onto the nut of a wedge anchor and a second opening configured to receive a predetermined length of the outer end of the wedge anchor's bolt; engaging the anchor driver-hammer drill assembly with the wedge anchor and using the anchor driver-hammer drill assembly, with the hammer drill in hammer mode, to hammer the wedge anchor into the hole; and, without disengaging the anchor driver-hammer drill assembly from the wedge anchor, switching the hammer drill to drill mode to tighten the nut of the wedge anchor using the anchor driver-hammer drill assembly in drill mode.

2. The method of claim 1, wherein the anchor driver is a solid wedge anchor driver, and wherein both, the hammering and the tightening, are performed using the solid wedge anchor driver secured into the chuck of the hammer drill.

3. The method of claim 1, wherein the second opening has a cylindrical shape and wherein the first opening has a hexagonal cross-section.

4. The method of claim 1, wherein anchor driver further comprises a second portion removably associated with the first portion such that the first portion can be replaced by a user with any other first portion the user selects from a set of first portions having various sizes or shapes corresponding to various sizes or shapes of wedge anchor nut or bolt.

5. The method of claim 4, wherein the second portion of the anchor driver comprises a shank, a cylinder, and a rectangular protrusion having a spring-loaded mechanism, such that the association of the second portion with the first portion is obtained by inserting the rectangular protrusion into a third opening of the first portion.

* * * * *